United States Patent [19]
Luo et al.

[11] Patent Number: 5,791,646
[45] Date of Patent: Aug. 11, 1998

[54] AUTOMATIC DOCUMENT FEEDER

[75] Inventors: Chih-Lung Luo; Yang-Teh Lee, both of Taipei, Taiwan

[73] Assignee: Behavior Tech Computer Corp., Taipei, Taiwan

[21] Appl. No.: 699,663

[22] Filed: Aug. 19, 1996

[51] Int. Cl.[6] .............................. B65H 5/00; B65H 7/02
[52] U.S. Cl. ................ 271/10.11; 271/272; 271/265.01; 271/10.02
[58] Field of Search .................. 271/10.09, 10.11, 271/10.13, 10.12, 272–274, 270, 265.01, 10.02

[56] References Cited

U.S. PATENT DOCUMENTS 5,222,723  6/1993  Ijuin ................................. 271/10.11

*Primary Examiner*—Boris Milef

[57] ABSTRACT

An automatic document feeder to be incorporated in a scanner document forwarding mechanism which comprises a reduction gear assembly driven by a motor and having at least one gear and a pair of mated rollers through which a document to be fed by the document feeder travels is disclosed. The document feeder includes a gear train having an input gear mechanically coupled to the gear of the reduction gear assembly of the scanner document forwarding mechanism via two idle gears to be driven thereby and an output gear mechanically coupled to the input gear via a pinion co-axially fixed to the input gear and engaging the output gear. A document driving roller is provided and co-axially fixed to the output gear to be driven thereby for engaging and driving the document to be fed into the scanner document forwarding mechanism. A document guide is provided close to the document driving roller for guiding the document therethrough toward the scanner document forwarding mechanism. A document sensor is provided to detect the existence of the document and generates a signal to turn on the motor upon detecting the document.

2 Claims, 6 Drawing Sheets

AUTOMATIC DOCUMENT FEEDER

FIELD OF THE INVENTION

The present invention relates generally to a document feeder for use in for example a scanner and in particular to an automatic document feeder that needs no own mechanical power source.

BACKGROUND OF THE INVENTION

Scanners have been widely used to read documents as an input device for electronic data processing apparatus. Some of the scanners are devised with document forwarding mechanisms for driving the document to be scanned through the scanners. In FIGS. 4–6 of the attached drawings, a document forwarding mechanism that is currently used in the scanners available in the market is shown. The document forwarding mechanism is generally designated with reference numeral 1 in the drawings. FIGS. 4–6 sequentially show the document forwarding operation of the document forwarding mechanism.

The document forwarding mechanism 1 comprises a motor 12 which is actuated by an electricity supply to serve as a mechanical power source for driving the mechanism 1 and two document driving roller pairs, each comprising two mated rollers 161 and 17. A reduction gear assembly is arranged to connect between the document driving roller pairs and the motor 12. The reduction gear assembly comprises a primary gear 13 mating an output pinion 121 fixed on the spindle of the motor 12, with a pinion 131 co-axially fixed to the primary gear 13 to engage a secondary gear 14. The secondary gear 14 in turn drives two gear trains, each comprising a first gear 15 having a pinion 151 co-axially fixed thereto and a second gear 16 mating the pinion 151. The roller 161 is co-axially fixed on the second gear 16 and in surface contact engagement with the counterpart roller 17 for forwarding a document 3 therethrough between the rollers 161 and 17.

A scanning transducer 11 is disposed inbetween the two roller pairs (161, 17) for reading information on the document 3 that is fed through the two roller pairs (161, 17).

Such a document forwarding mechanism 1 serves to move document through the scanner to be read thereby, yet it is not provided with the function for feeding the document into the scanner. Thus, for feeding document into the scanner, an external document feeder is needed, which feeds the document into the scanner to such a location where the document forwarding mechanism built inside the scanner is capable of driving the document forward.

Heretofore, the external document feeder that is now adapted in the scanner needs its own mechanical power source, for example a motor, to drive the feeder in order to perform the document feeding operation. A disadvantage of the document feeder of this type is that the document feeder may not be synchronous with the document forwarding mechanism of the scanner for they are powered independently. Further, the additional motor that is used to drive the document feeder increases the cost.

It is therefore desirable to provide a document feeder to be driven by the document forwarding mechanism of the scanner so as to overcome the drawbacks of the prior art.

SUMMARY OF THE INVENTION

Thus an object of the present invention is to provide an automatic document feeder which is in mechanical coupling with and driven by the document forwarding mechanism of a scanner so as to be synchronous with the document forwarding mechanism of the scanner.

Another object of the present invention is to provide an automatic document feeder which is in mechanical coupling with and driven by the document forwarding mechanism of a scanner so that no additional mechanical power source, such as a motor, is needed for the document feeder.

To achieve the above objects, there is provided an automatic document feeder to be incorporated in a scanner document forwarding mechanism which comprises a reduction gear assembly driven by a motor and having at least one gear and a pair of mated rollers through which a document to be fed by the document feeder travels. The document feeder includes a gear train having an input gear mechanically coupled to the gear of the reduction gear assembly of the scanner document forwarding mechanism via two idle gears to be driven thereby and an output gear mechanically coupled to the input gear via a pinion co-axially fixed to the input gear and engaging the output gear. A document driving roller is provided and co-axially fixed to the output gear to be driven thereby for engaging and driving the document to be fed into the scanner document forwarding mechanism. A document guide is provided close to the document driving roller for guiding the document therethrough toward the scanner document forwarding mechanism. A document sensor is provided to detect the existence of the document and generates a signal to turn on the motor upon detecting the document.

These and other objects and advantages of the present invention will become more apparent from a consideration of the following detailed description of a preferred embodiment thereof, when read in conjunction with the accompanying drawings, wherein:

DETAILED DESCRIPTION OF THE PREFERRED EMBODIMENT

Figure 1:
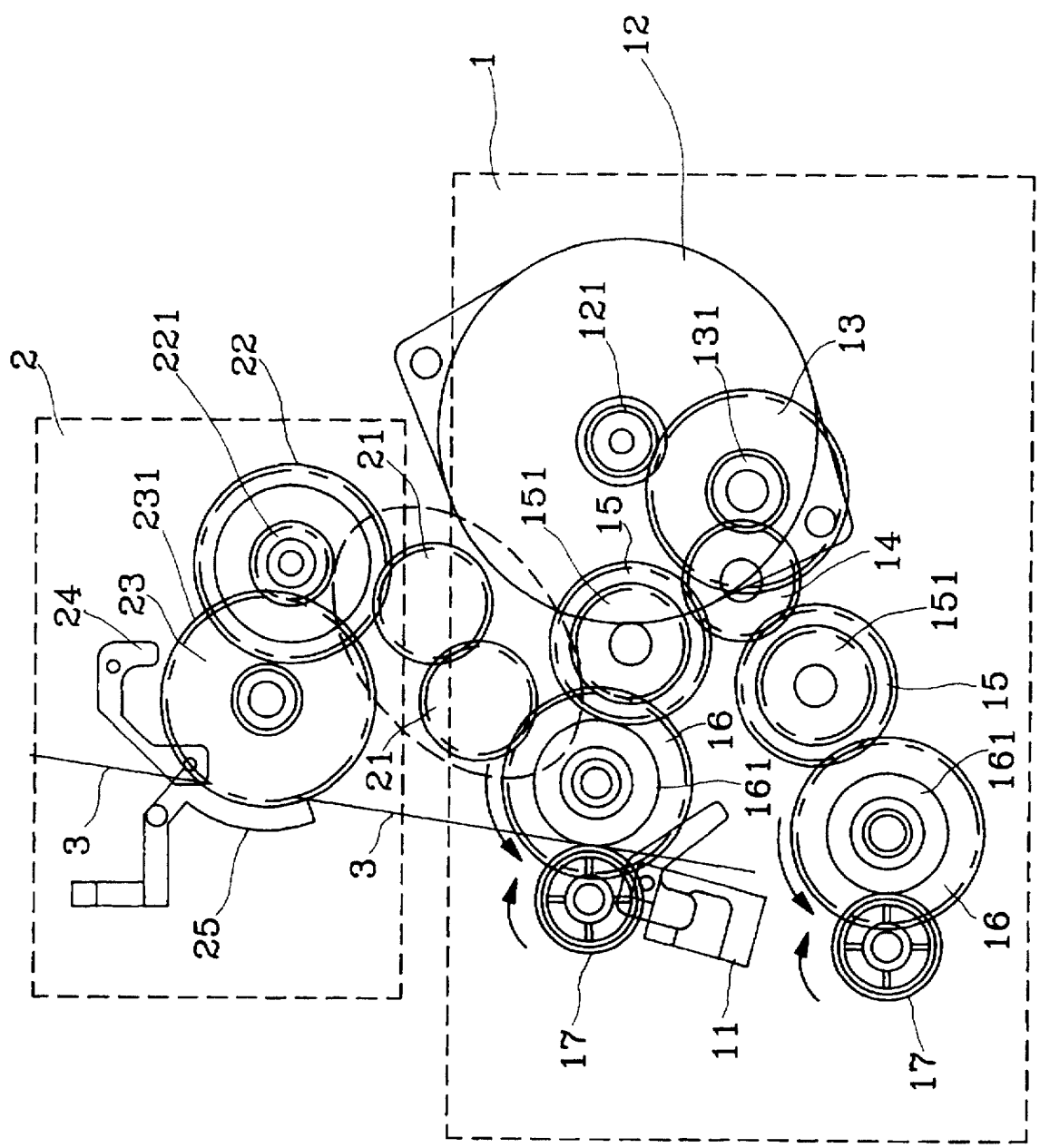
FIGS. 1–3 are schematic plan views of an automatic document feeder mechanism constructed in accordance with the present invention and mechanically coupled to a document forwarding mechanism of a scanner, showing in sequence the document feeding operation of the document feeder.
Figure 2:
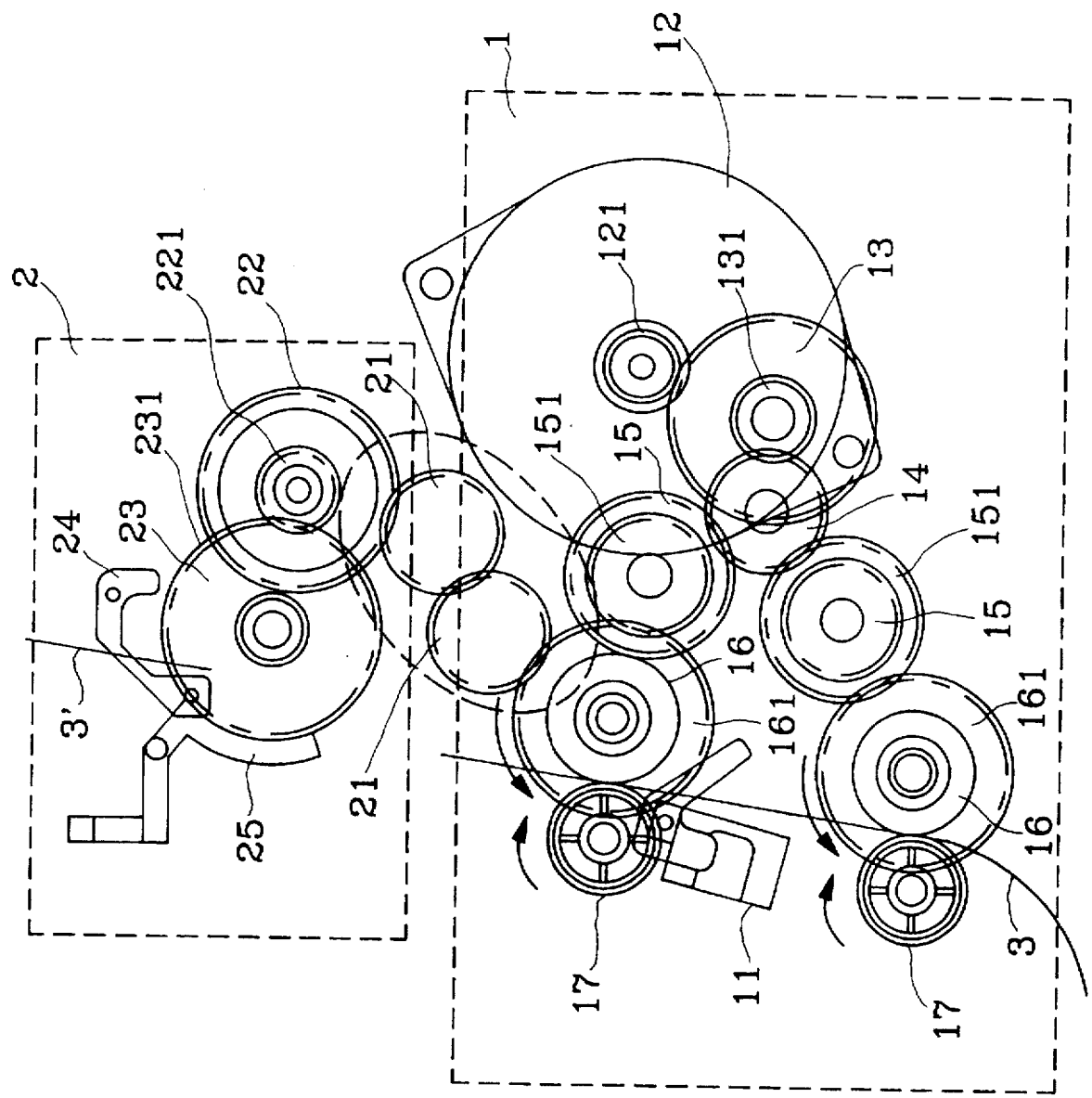
Figure 3:
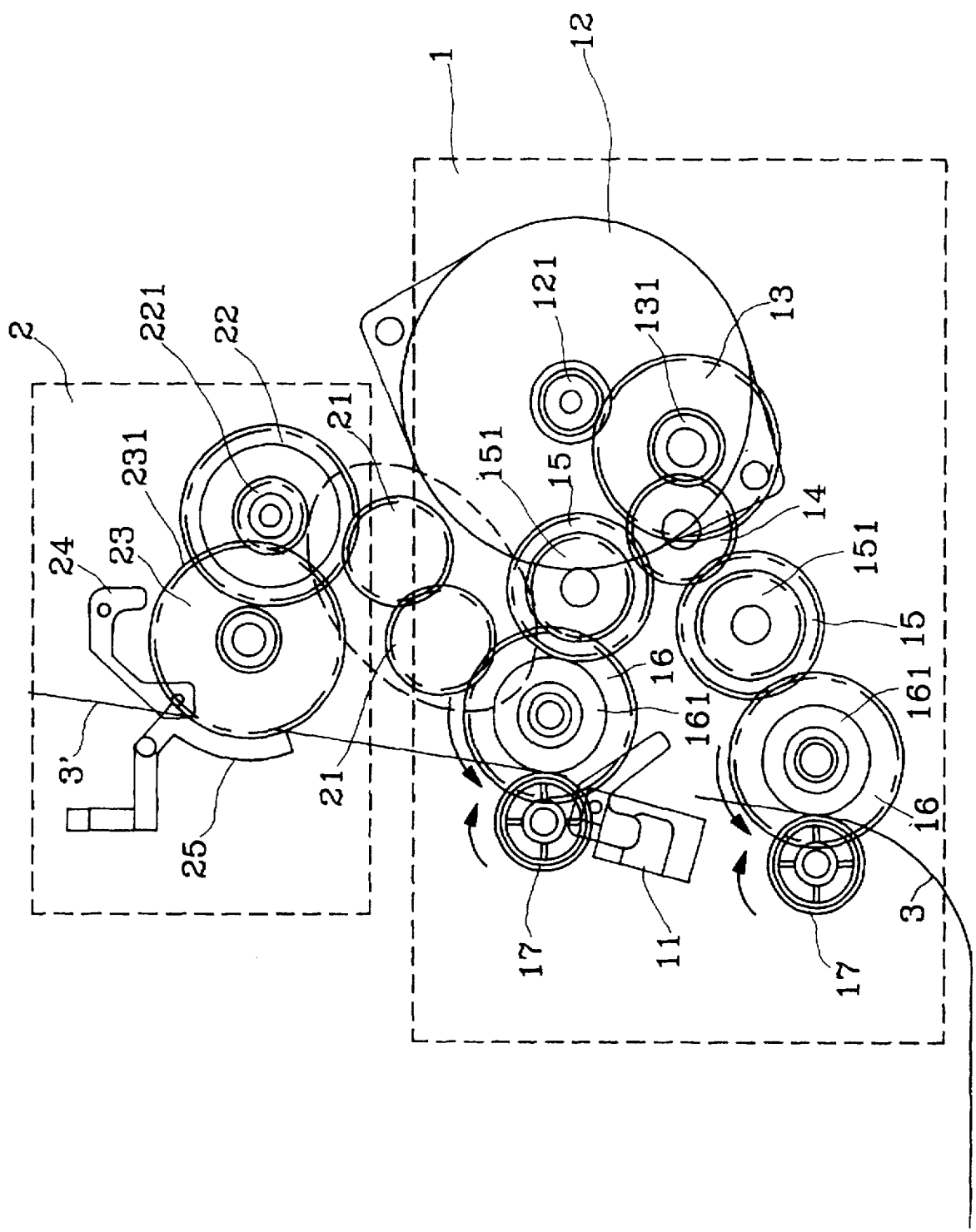
Figure 4:
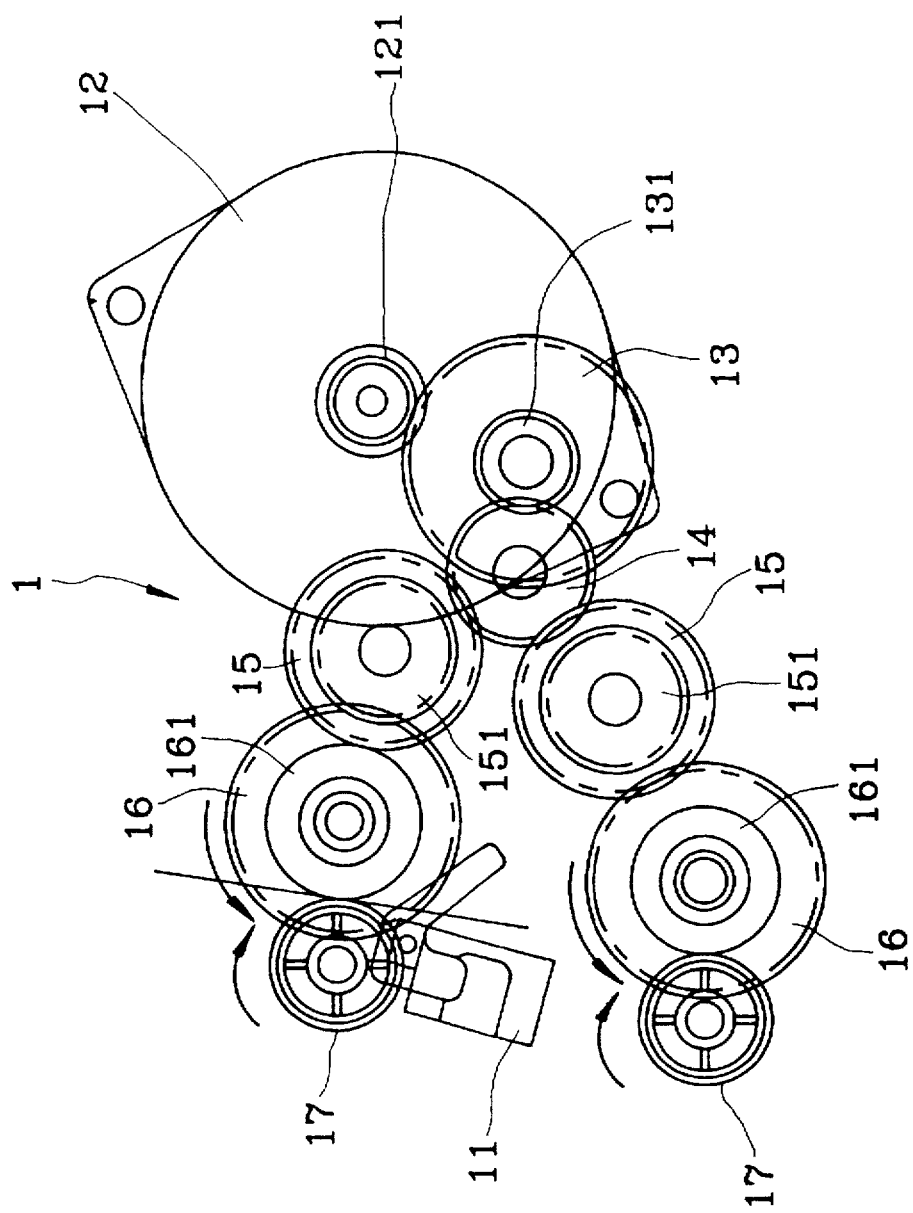
FIGS. 4–6 are schematic plan views of a known document forwarding mechanism adapted in the scanner to which the automatic document feeder mechanism of the present invention can be coupled, showing the document forwarding operation during the scanning operation of the scanner.
Figure 5:
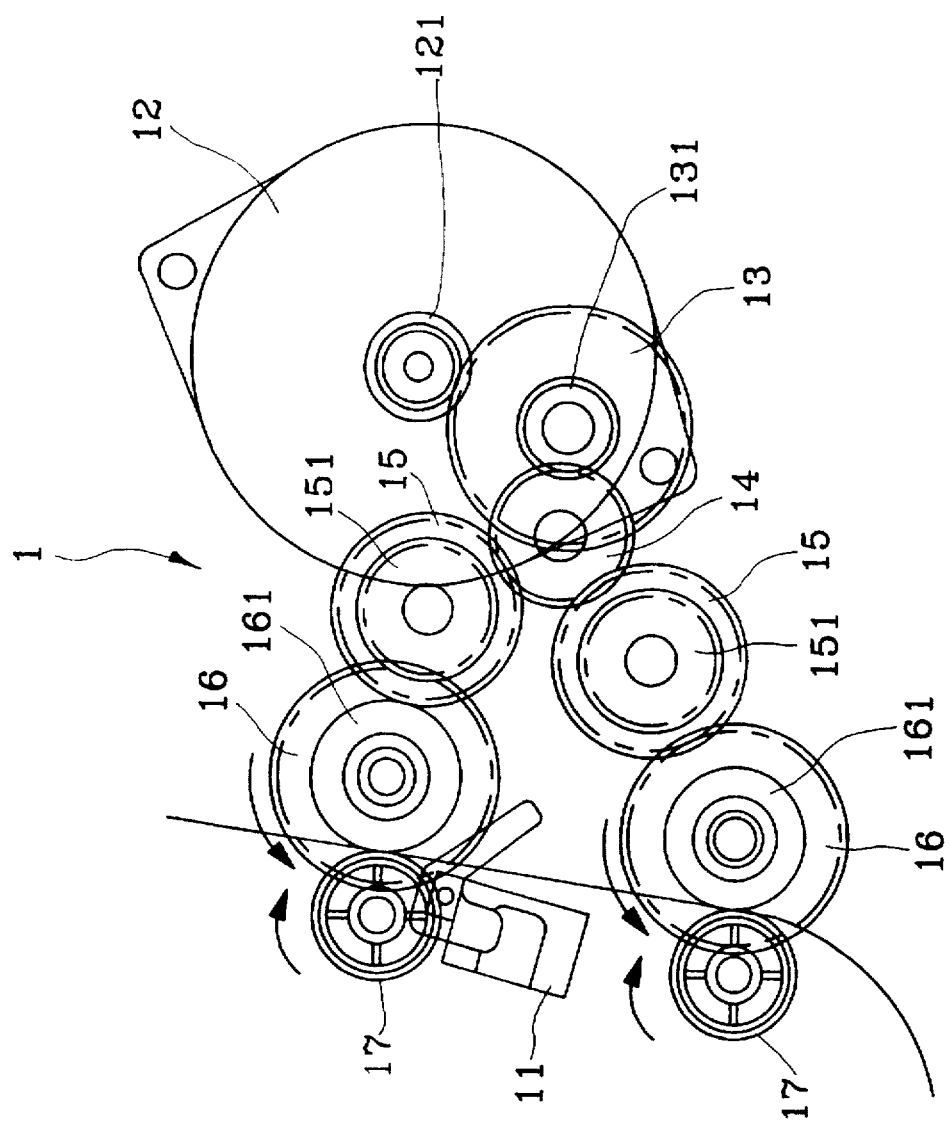
Figure 6:
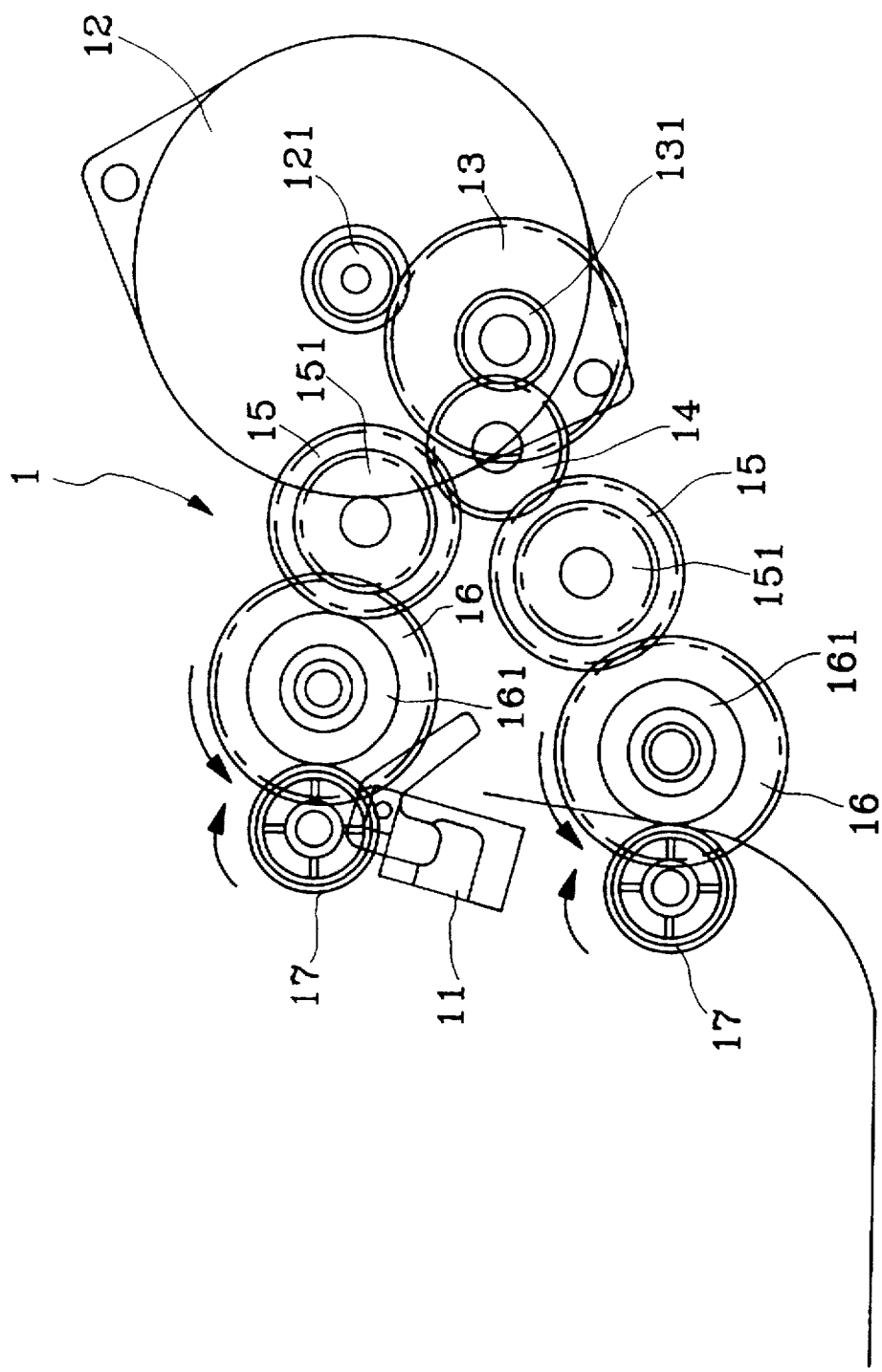

Referring to the drawings and in particular to FIGS. 1–3, wherein an automatic document feeder constructed in accordance with the present invention, generally designated with reference numeral 2, is shown mechanically coupled to a scanner document forwarding mechanism, generally designated with reference numeral 1, the automatic document feeder 2 comprises a gear train mechanically coupled to the scanner document forwarding mechanism 1 via two idle gears 21 which engage each other. A first one of the idle gears 21 engages the second gear 16 of one of the gear trains of the reduction gear assembly of the scanner document forwarding mechanism 1 to be driven thereby.

The gear train of the automatic document feeder 2 comprises an input gear 22 mating and driven by a second one of the idle gears 21. A pinion 221 is co-axially fixed to the input gear 22 and engages and drives an output gear 23. A document driving roller 231 is co-axially fixed to the output gear 23. A document guide 25 is arranged adjacent to the document driving roller 231 to define therebetween a gap or spacing for guiding and moving a document 3 therethrough toward the scanner document forwarding mechanism 1.

A document sensor 24 is provided at a location sufficient close to the document driving roller 231 and the document guide 25 so that a signal is generated thereby when a document 3 is placed into the automatic document feeder 2 and detected by the sensor 24.

FIGS. 1–3 sequentially illustrate the operation of feeding a document 3 into the automatic document feeder 2 and then driven forward by the document forwarding mechanism 1 of the scanner.

In operation, the document 3 is placed into the automatic document feeder 2 and the sensor 24, which may be powered by the same electricity supply of the motor 12 of the scanner document forwarding mechanism 1, upon detecting the document 3, generates a signal to turn on the motor 12. The motor 12 then actuates the reduction gear assembly of the document forwarding mechanism to drive the gear train of the automatic document feeder through the idle gears 21 and thus moving the document 3 forward with the document driving roller 231 of the automatic document feeder 2, as shown in FIG. 1.

The document 3 that is fed into the scanner by the automatic document feeder 2 is then driven forward by the roller pairs (161, 17) of the scanner document forwarding mechanism 1, as shown in FIG. 2. At this moment, the transducer 11 reads information on the document 3.

At the time when the document 3 passes through the scanner, a next document 3', if any, is fed into the scanner by the automatic document feeder 2 to be read by the transducer 11, as shown in FIG. 3. This process can be repeated any desired number of times so as to continuously scan a number of documents.

Those skilled in the art will readily recognize that various modifications of the present invention may be made without departing the scope of the present invention defined in the appended claim. Accordingly the preferred embodiment illustrated and discussed herein should be understood to be exemplary only in nature and the scope of the instant invention should be limited only by the following claims.

What is claimed is:

1. A document feeder coupled by a mechanical coupling to a scanner document forwarding mechanism which comprises a reduction gear assembly driven by a mechanical power source and having at least one gear and a pair of mated rollers through which a document to be fed by the document feeder travels, said document feeder comprising a mechanical transmission system having:

a rotary input element mechanically coupled to the gear of the reduction gear assembly of said scanner document forwarding mechanism, said rotary input element having a gear;

a rotary output element mechanically coupled to said rotary input element, said rotary output element having a gear and being engaged continuously with said rotary input element and rotating synchronously with said rotary input element when said rotary input element is rotated by said scanner document forwarding mechanism through the mechanical coupling; and a document driving roller being co-axially fixed to said rotary output element for engaging and driving said document into said document forwarding mechanism;

wherein the mechanical coupling between said document feeder and said scanner document forwarding mechanism comprises at least one idle gear engaging between the gear of said scanner document forwarding mechanism and the gear of said rotary input element.

2. The document feeder as claimed in claim 1, wherein the mechanical coupling between said document feeder and said scanner document forwarding mechanism comprises two idle gears.

* * * * *